US010400879B2

United States Patent
Cashatt et al.

(10) Patent No.: US 10,400,879 B2
(45) Date of Patent: Sep. 3, 2019

(54) ONE WAY CLUTCH OPERATION MONITORING IN TORQUE CONVERTER

(71) Applicant: Caterpillar Inc., Peoria, IL (US)

(72) Inventors: Paul D. Cashatt, Edwards, IL (US); Chintankumar G. Kothari, Dunlap, IL (US); Randall T. Anderson, Peoria, IL (US); Bradley J. Will, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 738 days.

(21) Appl. No.: 15/043,782

(22) Filed: Feb. 15, 2016

(65) Prior Publication Data

US 2017/0234420 A1    Aug. 17, 2017

(51) Int. Cl.
*F16H 57/01* (2012.01)
*F16H 45/02* (2006.01)
*F16H 39/42* (2006.01)
*F16H 57/12* (2006.01)

(52) U.S. Cl.
CPC .............. *F16H 57/01* (2013.01); *F16H 39/42* (2013.01); *F16H 45/02* (2013.01); *F16H 57/12* (2013.01); *F16D 2300/18* (2013.01); *F16H 2057/018* (2013.01)

(58) Field of Classification Search
None
See application file for complete search history.

(56) References Cited

U.S. PATENT DOCUMENTS

| | | | | |
|---|---|---|---|---|
| 4,304,155 A | * | 12/1981 | Want | B60W 10/02 |
| | | | | 192/3.52 |
| 5,599,254 A | * | 2/1997 | Tomisawa | F16H 61/12 |
| | | | | 192/3.3 |
| 5,879,266 A | * | 3/1999 | Sawamura | B60W 10/06 |
| | | | | 477/143 |
| 5,976,055 A | * | 11/1999 | Sasaki | F16H 61/14 |
| | | | | 477/176 |
| 6,517,464 B2 | | 2/2003 | Yamazaki et al. | |
| 6,722,456 B2 | | 4/2004 | Hisada | |
| 7,611,441 B2 | * | 11/2009 | Cring | B60K 23/0808 |
| | | | | 477/174 |
| 7,690,457 B2 | | 4/2010 | Nakanowatari | |

FOREIGN PATENT DOCUMENTS

| JP | 4236846 | 8/1992 |
|---|---|---|
| JP | 5172237 | 7/1993 |
| JP | 03101789 | 10/2000 |

* cited by examiner

*Primary Examiner* — Colby M Hansen
(74) *Attorney, Agent, or Firm* — Jeff A. Greene

(57) ABSTRACT

A control system for monitoring a torque converter in a machine is disclosed. The control system includes a first speed sensor associated with a driving shaft of the torque converter. The first sensor is configured to measure an input speed of the torque converter. The control system further includes a second speed sensor associated with an output shaft of the torque converter. The second sensor is configured to measure an output speed of the torque converter. The control system further includes a processing module adapted to calculate a speed ratio based on the signals received from the first speed sensor and the second speed sensor. The control system further includes an output module adapted to provide indication for a seized condition of a one way clutch in the torque converter based on the speed ratio.

20 Claims, 3 Drawing Sheets

ONE WAY CLUTCH OPERATION MONITORING IN TORQUE CONVERTER

TECHNICAL FIELD

The present disclosure relates to a torque converter, and more particularly to a system and method for monitoring the operation of a one way clutch in the torque converter.

BACKGROUND

Machines with automatic transmission employ a torque converter. The torque converter is a hydrodynamic fluid coupling that typically transfers a rotational torque from a prime mover to a driven load, via a transmission. The torque converter typically includes an impeller, a turbine, and a stator. The impeller is connected to a driving shaft of the prime mover, such as a crank shaft of an internal combustion engine. The turbine is connected to an output shaft, such as a transmission input shaft. In the basic fluid coupling design of the torque converter, the fluid flow returning from the turbine to the impeller opposes a rotation of the impeller, leading to a loss of efficiency and generation of heat.

In modern torque converter designs, the stator is provided to redirect the returning fluid flow such that it aids the rotation of the impeller, instead of opposing it. This results in energy that is recovered from the returning fluid and added to the energy supplied by the prime mover to the impeller. This also increases the fluid flow which is directed to the turbine, producing an increase in output torque. Since the returning fluid is traveling in a direction opposite of impeller rotation the stator may try to counter-rotate as it forces the returning fluid to change direction; to prevent this effect a one way stator clutch is provided to prevent the stator from rotating. As the turbine speed increases and approaches the impeller speed in response to reduced load on the output shaft, the fluid flow from the turbine to the impeller decreases. At some point the flow being returned from the turbine will decrease enough, in the reverse direction, and attempt to rotate the stator in the opposite direction so as to unlock the stator clutch. When the stator clutch unlocks the impeller, turbine and stator will all rotate at roughly the same speed. Furthermore, a lock-up clutch is provided to physically couple the impeller and turbine, and effectively change the torque converter into a purely mechanical coupling. This result in no slippage, and virtually no power loss.

SUMMARY OF THE DISCLOSURE

According to an aspect of the present disclosure, a control system for monitoring a torque converter in a machine is described. The control system includes a first speed sensor associated with a driving shaft of the torque converter. The first sensor is configured to measure an input speed of the torque converter. The control system further includes a second speed sensor associated with an output shaft of the torque converter. The second sensor is configured to measure an output speed of the torque converter. The control system further includes a processing module adapted to calculate a speed ratio based on the signals received from the first speed sensor and the second speed sensor. The control system further includes an output module adapted to provide indication for a seized condition of a one way clutch in the torque converter based on the speed ratio.

In another aspect of the present disclosure, a machine is provided. The machine includes an engine, a torque converter operatively coupled to the engine via a driving shaft, a transmission operatively coupled to the torque converter via an output shaft, and a control system for monitoring a torque converter in the machine. The control system includes a first speed sensor associated with a driving shaft of the torque converter. The first sensor is configured to measure the input speed of the torque converter. The control system further includes a second speed sensor associated with an output shaft of the torque converter. The second sensor is configured to measure the output speed of the torque converter. The control system further includes a processing module adapted to calculate a speed ratio based on the signals received from the first speed sensor and the second speed sensor. The control system further includes an output module adapted to provide indication for a seized condition of a one way clutch in the torque converter based on the speed ratio.

In yet another aspect of the present disclosure, a method of monitoring a torque converter in a machine is provided. The method includes determining an input speed associated with a driving shaft of the torque converter. The method further includes determining an output speed associated with an output shaft of the torque converter. The method further includes calculating a speed ratio based on the input speed and the output speed. The method further includes providing an indication for a seized condition of a one way clutch in the torque converter based on the speed ratio.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
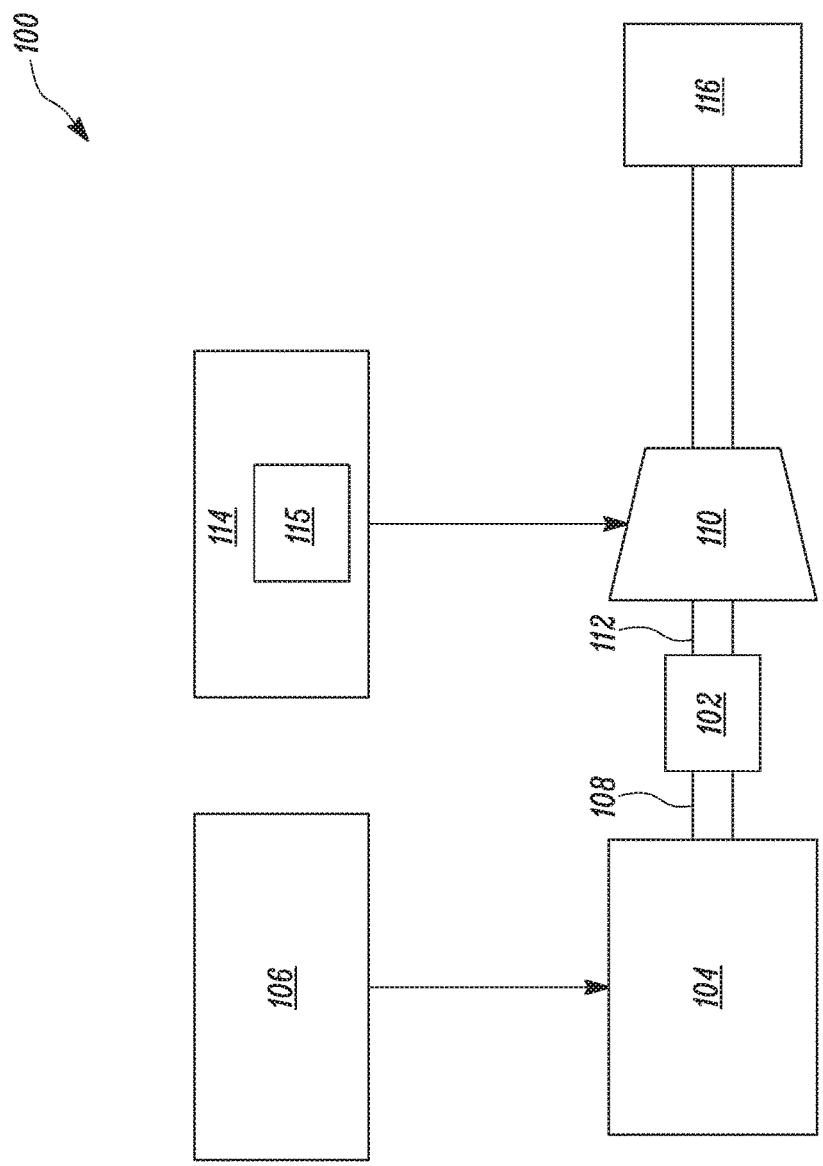
FIG. 1 illustrates a schematic block diagram of a machine equipped with a torque converter.

FIG. 1 illustrates a schematic block diagram of a machine 100 equipped with a torque converter 102. The machine 100 may be a machine that is employed in various applications including, but not limited to, mining, quarrying, road construction, and site preparation. The machine 100 may be embodied as machine, such as a wheel loader, a mining truck, an off-highway truck, an articulated truck, an on-highway truck, or the like. In alternative embodiments of the present disclosure, the machine 100 can optionally be embodied in the form of a manually operated machine, an autonomous machine, or a machine that is operable in both manual and autonomous mode.

Referring to FIG. 1, the machine 100 includes a prime mover, such as an engine 104. The engine 104 may be an internal combustion engine. The engine 104 may be a spark ignition engine or a compression ignition engine, such as a diesel engine, a homogeneous charge compression ignition engine, or a reactivity controlled compression ignition engine, or other compression ignition engines known in the art. The engine 104 may be configured to operate on fuels, such as gasoline, diesel fuel, biodiesel, alcohol, natural gas or a combination thereof. The engine 104 may be of multi-cylinder type, or a single-cylinder engine. Moreover, the engine 104 may be of a V-type configuration, an in line configuration, or a radial configuration. A person having ordinary skill in the art will appreciate that embodiment of the present disclosure may be beneficially implemented in various types of engines commonly known in the art without deviating from the spirit of the present disclosure. Alternatively, the prime mover may be an electric motor or any other power source known in the art.

An engine control unit 106 is operatively connected to the engine 104. The engine control unit 106 may be used to control a series of actuators in the engine 104 to ensure optimal engine performance. In an embodiment, the engine control unit 106 may be a processor that includes a single processing unit or a number of processing units, all of which include multiple computing units. The explicit use of the term 'processor' should not be construed to refer exclusively to hardware capable of executing a software application. In this example, the engine control unit 106 may be implemented as one or more microprocessors, microcomputers, digital signal processors, central processing units, state machines, logic circuitries, and/or any device that is capable of manipulating signals based on operational instructions. Among the capabilities mentioned herein, the engine control unit 106 may also be configured to receive, transmit, and execute computer-readable instructions.

The torque converter 102 is a hydrodynamic fluid coupling that typically transfers a rotational torque from the engine 104 to a load 116 via a transmission 110. In an example, a driving shaft 108 may be used to transmit torque from the engine 104 to the torque converter 102. The torque converter 102 is further rotatably coupled to the transmission 110 of the machine 100 through an output shaft 112. The output shaft 112 may be used to transmit power from the torque converter 102 to the load 116, such as ground-engaging elements (not shown) of the machine 100 via the transmission 110.

The transmission 110 of the machine 100 is controlled by a transmission control unit 114. The transmission control unit 114 may use information received from a controller 115 through a variety of sensors within the machine 100 and also data provided by the engine control unit 106 for improving an efficiency of the engine 104 of the machine 100. In an example, input parameters for the transmission control unit 114 may include a vehicle speed, a ground-engaging element speed, a throttle position, a transmission fluid temperature, switches position, an input from a traction control system, and an input from the controller 115.

Figure 2:
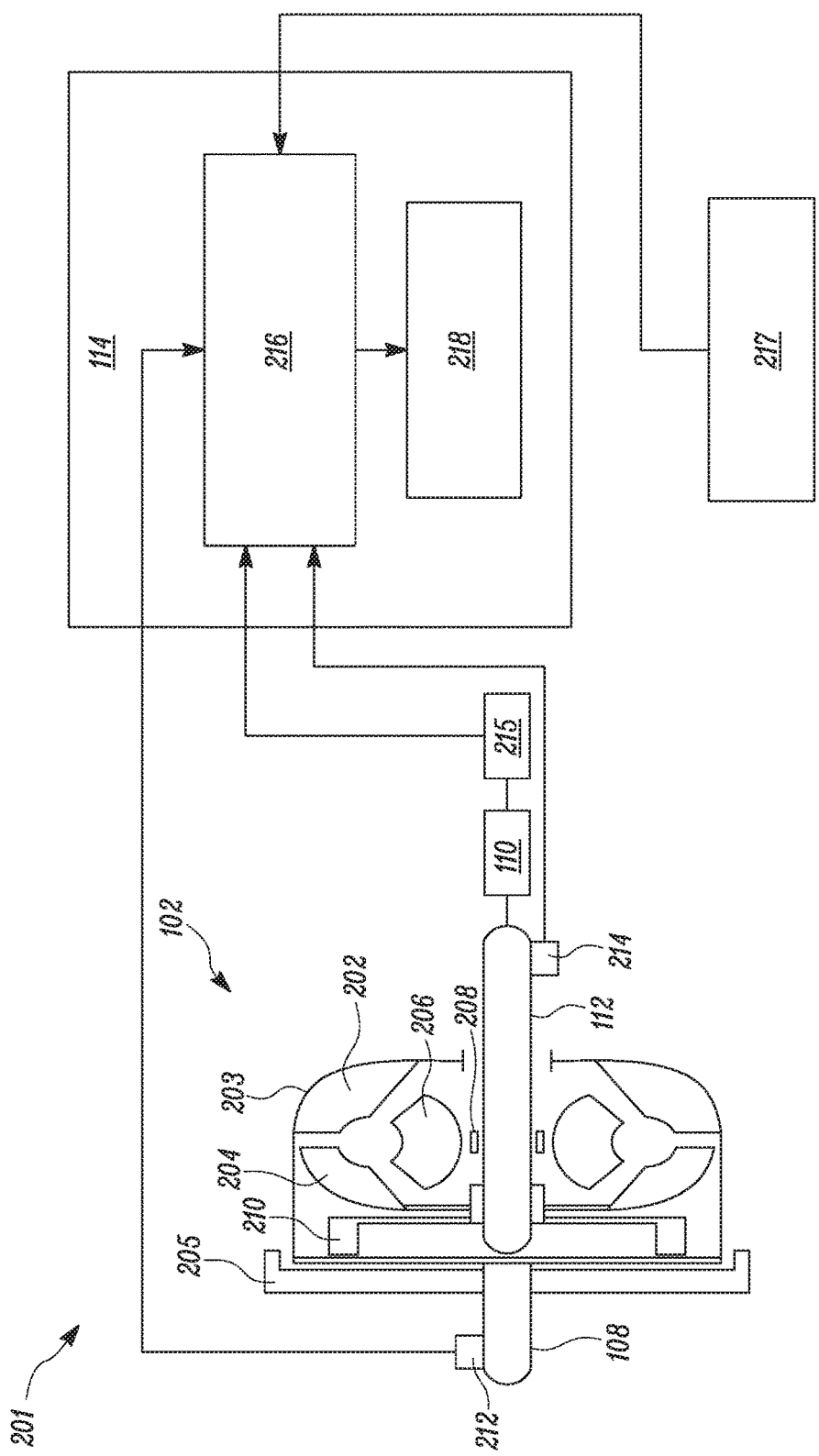
FIG. 2 illustrates a control system for monitoring the torque converter, according to an embodiment of the present disclosure.

FIG. 2 illustrates a control system 201 for monitoring the torque converter 102 in the machine 100, according to an embodiment of the present disclosure. The torque converter 102 includes a housing 203 filled with fluid and the housing 203 is rigidly coupled to the driving shaft 108, such that the housing 203 is adapted to be rotated by the driving shaft 108. In an example, the housing 203 of the torque converter 102 may be mounted to a flywheel 205 of the engine 104. In an example, the driving shaft 108 may be a splined shaft to accommodate the flywheel 205 thereon. The torque converter 102 further includes an impeller 202, a turbine 204, and a stator 206. The impeller 202 includes arrays of blades attached to an interior of the housing 203 of the torque converter 102. During the operation of the engine 104, the arrays of blades in the impeller 202 of the torque converter 102 are rotated by the driving shaft 108, and pump the fluid towards the turbine 204. The turbine 204 may also include arrays of blades attached to the output shaft 112 of the torque converter 102 via a spline arrangements or the like. During operation, the fluid pumped by the impeller 202 rotates the turbine 204, and transfers the rotational torque from the engine 104 to the transmission 110.

The stator 206 is disposed between the impeller 202 and the turbine 204 such that the stator 206 redirects the fluid that exits turbine 204 towards the impeller 202 to further increase the rotational speed of the impeller 204. To a person having ordinary skill in the art, the stator 206 may be construed as an array of stator blades adapted to turn a direction of fluid flow that is exiting the turbine 204 to align the direction of fluid flow with respect to the impeller 202. Further, the stator 206 is configured to freewheel during the operation and a one way clutch 208 is provided between the stator 206 and the output shaft 112. The one way clutch 208 prevents a counter rotation of the stator 206 with respect to the output shaft 112. Further, the torque converter 102 may include a lockup clutch 210. The lockup clutch 210 is adapted to lock the driving shaft 108 with the output shaft 112. The lockup clutch 210 may be in an engaged condition when the speed of the impeller 202 and the speed of the turbine 204 are substantially same. On the other hand, the lockup clutch 210 may be in a disengaged condition when the speed of the impeller 202 and the speed of the turbine 204 are different.

The control system 201 may include a first speed sensor 212. The first speed sensor 212 may be used to determine the speed associated with the driving shaft 108 of the torque converter 102. The control system 201 may further include a second speed sensor 214. The second speed sensor 214 may be used to determine the speed associated with the output shaft 112 of the torque converter 102. The control system 201 may further include a third speed sensor 215 coupled with a transmission output shaft of the transmission 110 to determine a transmission output speed of the transmission 110. A processing module 216 of the control system 201 may be adapted to calculate a speed ratio based on signals received from the first speed sensor 212 and the second speed sensor 214. In an example, the phrase 'speed ratio' can be understood as the ratio of the torque converter output speed (speed of the output shaft 112) to an input speed (speed of the driving shaft 108). The processing module 216 may be operatively connected with a clutch controller 217 of the machine 100 to determine operating state of the transmission 110. Further, the processing module 216 is operatively connected to the third speed sensor 215 to determine the transmission output speed.

According to an embodiment of the present disclosure, the processing module 216 may be adapted to monitor a neutral condition of the transmission 110 based on the input received from the clutch controller 217. The processing module 216 may further determine if the transmission output speed, based on the readings from the third speed sensor. Further, the processing module 216 compares the transmission output speed with a predetermined threshold corresponding to the transmission output speed. In one example, the processing module 216 determines whether the transmission output speed is zero. In another example, the processing module 216 determines whether the transmission output speed is non-zero. Further, the processing module 216 may also be adapted to monitor a speed at the driving shaft 108 and compare the monitored speed with a pre-stored threshold limit. The pre-stored threshold limit is engine specific speed and may vary from one engine to another. In an example, the pre-stored threshold limit is about 1700 rpm.

In an example where the transmission output speed is equal to the predetermined threshold corresponding to the transmission output speed, the transmission operation state is neutral, and the speed at the driving shaft 108 is above the pre-stored threshold limit, an output module 218 of the control system 201, is adapted to provide indication for a seized condition of the one way clutch 208 in the torque converter 102 based on the speed ratio. In an embodiment, the control system 201 may be adapted to provide a negative check that may be indicative of the seized condition of the one way clutch 208 in the torque converter 102, if the speed ratio is greater than an upper limit speed ratio. In an example, the output module 218 provides the negative check when the speed ratio is greater than 1.02 (i.e. about 1.02 and above). Further, the control system 201 may be adapted to provide a positive check that may be indicative of a freewheel condition of the one way clutch 208 in the torque converter 102, if the speed ratio is below a lower limit speed ratio. In an example, the output module 218 provides the positive check when the speed ratio is below 0.98 (i.e. about 0.98 and below). It will be apparent to a person having ordinary skill in the art that the above speed ratios are exemplary in nature and the speed ratios may vary based on the torque convertor application and design used in machines.

In an embodiment, the processing module 216 and the output module 218 are embedded within the controller 115 (see FIG. 1) of the transmission control unit 114. Further, during the operation of the machine 100, the controller 115 may monitor the condition of the one way clutch 208, and may provide a corresponding indication to an operator of the machine 100. The controller 115 may be configured to indicate the condition of the one way clutch 208 to the operator of the machine 100 in real time. Based on the indication from the controller 115, the operator may change the operating conditions of the machine 100 for improving the efficiency of the machine 100.

In an example, the controller 115 of the transmission control unit 144 may be a processor that includes a single processing unit or a number of units, all of which include multiple computing units. The explicit use of the term 'processor' should not be construed to refer exclusively to hardware capable of executing a software application. In this example, the controller 115 may be implemented as one or more microprocessors, microcomputers, digital signal processors, central processing units, state machines, logic circuitries, and/or any device that is capable of manipulating signals based on operational instructions. Among the capabilities mentioned herein, the controller 115 may also be configured to receive, transmit, and execute computer-readable instructions.

INDUSTRIAL APPLICABILITY

The present disclosure relates to the control system 201 and a method 300 for monitoring the torque converter 102 in the machine 100. The control system 201 may indicate the seized condition of the one way clutch 208 to the operator of the machine 100 in real time. Based on the indication from the controller 115, the operator may change the operating conditions of the machine 100 for improving the efficiency of the machine 100. As such, the operator may schedule a servicing activity of the torque converter 102.

Figure 3:
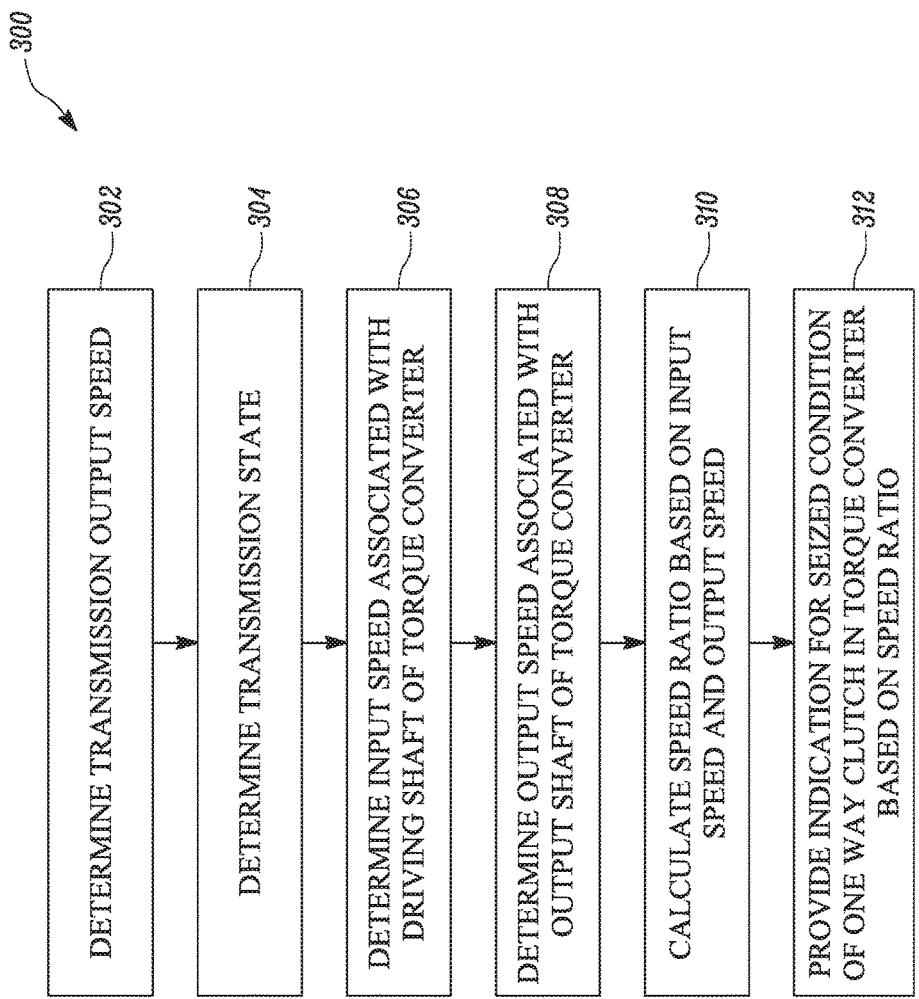
FIG. 3 illustrates a flowchart of a method of monitoring the torque converter in the machine, according to an embodiment of the present disclosure.

FIG. 3 illustrates a flowchart of the method 300 of monitoring the torque converter 102 in the machine 100, according to an embodiment of the present disclosure. At step 302, the method 300 includes determining the transmission output speed. The transmission output speed is determined by the processing module 216 based on the input received from the third speed sensor 215. Further, the transmission output speed is compared with the predetermined threshold corresponding to the transmission output speed. The transmission output speed may be zero or non-zero. In an example wherein the transmission output speed is zero, the method 300 moves to step 304. At step 304, the processing module 216 check form the operating state of the transmission 110, based on the input received from the clutch controller 217, and if the operating state of the transmission 110 is neutral the method 300 moves to step 306. At step 306 of the method 300 includes determining an input speed associated with the driving shaft 108 of the torque converter 102.

In one example, the transmission output speed of the transmission 110 and the operating state of the transmission 110 may be determined prior to determining the input speed. The input speed associated with the driving shaft 108 is determined by the processing module 216 based on the input received from the first speed sensor 212. At the following step 308, the method 300 includes determining an output speed associated with the output shaft 112 of the torque converter 102. The output speed associated with the output shaft 112 is determined by the processing module 216 based on the input received from the second speed sensor 214. At step 310, the method 300 includes calculating a speed ratio based on the input speed and the output speed. Further, at step 312, the method 300 includes providing an indication for a seized condition of a one way clutch 208 in the torque converter 102 based on the speed ratio.

Further, the method 300 includes providing a negative check that may be indicative of the seized condition of the one way clutch 208 in the torque converter 102, if the speed ratio is greater than the upper limit speed ratio. The method 300 includes providing a positive check that may be indicative of the freewheel condition of the one way clutch 208 in the torque converter 102, if the speed ratio is lesser than the lower limit speed ratio. The output module 218 of the control system 201 provides the indication, may be visual or audio, if the seized condition of a one way clutch 208 is determined.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A control system for monitoring a torque converter in a machine, the control system comprising:
    a first speed sensor associated with a driving shaft of the torque converter, the first sensor configured to measure an input speed of the torque converter;
    a second speed sensor associated with an output shaft of the torque converter, the second sensor configured to measure an output speed of the torque converter;
    a processing module adapted to calculate a speed ratio based on the signals received from the first speed sensor and the second speed sensor; and an output module adapted to provide indication for a seized condition of a one way clutch in the torque converter based on the speed ratio.

2. The control system of claim 1 is adapted to provide a negative check indicative of the seized condition of the one way clutch in the torque converter in case the speed ratio is greater than an upper limit speed ratio.

3. The control system of claim 2, wherein the upper limit speed ratio is about 1.02.

4. The control system of claim 1 is adapted to provide a positive check indicative of a freewheel condition of the one way clutch in the torque converter in case the speed ratio is below a lower limit speed ratio.

5. The control system of claim 4, wherein the lower limit speed ratio about 0.98.

6. The control system of claim 1, wherein the processing module is adapted to monitor a speed at the driving shaft and compare with a pre-stored threshold limit.

7. The control system of claim 6, wherein the pre-stored threshold limit is about 1700 rpm.

8. The control system of claim 1 further comprising a third speed sensor associated with a transmission output shaft of a transmission to determine a transmission output speed.

9. The control system of claim 1, wherein the processing module is operatively connected with a clutch controller of the machine to determine an operating state of a transmission.

10. A machine comprising:
an engine;
a torque converter operatively coupled to the engine via a driving shaft;
a transmission operatively coupled to the torque converter via an output shaft; and
a control system for monitoring a torque converter in the machine, the control system comprising:
a first speed sensor associated with the driving shaft of the torque converter, the first sensor configured to measure an input speed of the torque converter;
a second speed sensor associated with the output shaft of the torque converter, the second sensor configured to measure an output speed of the torque converter;
a processing module adapted to calculate a speed ratio based on the signals received from the first speed sensor and the second speed sensor; and
an output module adapted to provide indication for a seized condition of a one way clutch in the torque converter based on the speed ratio.

11. The machine of claim 10, wherein the control system is adapted to provide a negative check indicative of the seized condition of the one way clutch in the torque converter in case the speed ratio is greater than an upper limit speed ratio.

12. The machine of claim 10, wherein the control system is adapted to provide a positive check indicative of a freewheel condition of the one way clutch in the torque converter in case the speed ratio is below a lower limit speed ratio.

13. The machine of claim 10, wherein the processing module is adapted to monitor a speed at the driving shaft and compare with a pre-stored threshold limit.

14. The machine of claim 10, wherein the control system further comprising a third speed sensor associated with a transmission output shaft of a transmission to determine a transmission output speed.

15. The machine of claim 10, wherein the processing module is operatively connected with a clutch controller of the machine to determine an operating state of a transmission.

16. A method of monitoring a torque converter in a machine, the method system comprising:
determining an input speed associated with a driving shaft of the torque converter;
determining an output speed associated with an output shaft of the torque converter;
calculating a speed ratio based on the input speed and the output speed; and
providing an indication for a seized condition of a one way clutch in the torque converter based on the speed ratio.

17. The method of claim 16 further comprising providing a negative check indicative of the seized condition of the one way clutch in the torque converter in case the speed greater than an upper limit speed ratio.

18. The method of claim 16 further comprising providing a positive check indicative of a freewheel condition of the one way clutch in the torque converter in case the speed ratio is below a lower limit speed ratio.

19. The method of claim 16 further comprising monitoring a neutral condition of the transmission.

20. The method of claim 16 further comprising monitoring a transmission output speed of the transmission.

* * * * *